US011122960B2

(12) United States Patent
Hofmann et al.

(10) Patent No.: US 11,122,960 B2
(45) Date of Patent: Sep. 21, 2021

(54) DISHWASHING APPLIANCE HAVING AN AIR-DRYING DEHUMIDIFICATION ASSEMBLY

(71) Applicant: Haier US Appliance Solutions, Inc., Wilmington, DE (US)

(72) Inventors: Adam Christopher Hofmann, Louisville, KY (US); Timothy Kopera, Buffalo, NY (US); Ramasamy Thiyagarajan, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 51 days.

(21) Appl. No.: 16/794,411

(22) Filed: Feb. 19, 2020

(65) Prior Publication Data

US 2021/0251466 A1    Aug. 19, 2021

(51) Int. Cl.
  *A47L 15/46* (2006.01)
  *A47L 15/48* (2006.01)
  *A47L 15/42* (2006.01)

(52) U.S. Cl.
  CPC ......... *A47L 15/488* (2013.01); *A47L 15/4221* (2013.01); *A47L 15/4285* (2013.01); *A47L 15/4291* (2013.01); *A47L 15/46* (2013.01); *A47L 15/486* (2013.01); *A47L 2501/10* (2013.01)

(58) Field of Classification Search
  CPC .............. A47L 15/488; A47L 15/4221; A47L 15/4285; A47L 15/4291; A47L 15/46; A47L 15/486; A47L 2501/10
  See application file for complete search history.

(56) References Cited

U.S. PATENT DOCUMENTS

| 1,836,373 | A  | * | 12/1931 | Kadesch | ................ | A47L 15/00 |
|||||||134/56 D|
| 3,598,131 | A  | * | 8/1971 | Weihe, Jr. | ............... | B08B 15/00 |
|||||||134/107|
| 6,170,166 | B1 | * | 1/2001 | Johansen | ................ | A47L 15/48 |
|||||||34/595|
| 8,307,839 | B2 | * | 11/2012 | Peukert | ................ | A47L 15/241 |
|||||||134/107|

(Continued)

FOREIGN PATENT DOCUMENTS

| CH | 574732 A5 | 4/1976 |
| JP | 5382941 B2 | 1/2014 |

(Continued)

*Primary Examiner* — Benjamin L Osterhout
(74) *Attorney, Agent, or Firm* — Dority & Manning, P.A.

(57) ABSTRACT

A dishwashing appliance, as provided herein, may include a cabinet, a tub, a water tank, a wet air duct, a dry air duct, a water supply conduit, a diverter valve, and a diverted branch. The tub may be housed within the cabinet and may define a wash chamber. The water tank may be mounted within the cabinet outside of the wash chamber. The wet air duct may extend from the wash chamber to the water tank. The dry air duct may extend from the water tank to the wash chamber. The water supply conduit may extend to the wash chamber. The diverter valve may be disposed along the water supply conduit upstream from the wash chamber. The diverted branch may extend from the diverter valve to the water tank to selectively guide water from the water supply conduit to the water tank.

18 Claims, 4 Drawing Sheets

(56) References Cited

U.S. PATENT DOCUMENTS

| | | | |
|---|---|---|---|
| 8,869,424 B2 * | 10/2014 | Hermann | A47L 15/0034 34/486 |
| 10,750,925 B2 * | 8/2020 | Vallejo | A47L 15/483 |
| 2004/0261820 A1 * | 12/2004 | Monsrud | A47L 15/483 134/10 |
| 2006/0096621 A1 * | 5/2006 | Lee | A47L 15/483 134/56 D |
| 2007/0157954 A1 * | 7/2007 | Classen | A47L 15/481 134/56 D |
| 2008/0149142 A1 * | 6/2008 | Jerg | A47L 15/481 134/25.2 |
| 2008/0264455 A1 * | 10/2008 | Brewer | A47L 15/488 134/95.2 |
| 2008/0264458 A1 * | 10/2008 | Berner | A47L 15/488 134/57 D |
| 2009/0038661 A1 * | 2/2009 | Hildenbrand | A47L 15/483 134/56 D |
| 2010/0294323 A1 * | 11/2010 | Brunswick | A47L 15/4291 134/56 D |
| 2011/0114137 A1 * | 5/2011 | Jerg | A47L 15/481 134/115 R |
| 2011/0120510 A1 * | 5/2011 | Delle | A47L 15/481 134/115 R |
| 2011/0177772 A1 * | 7/2011 | Hockaday | A47L 15/0081 454/341 |
| 2013/0152968 A1 * | 6/2013 | Bertsch | A47L 15/0013 134/18 |
| 2018/0028042 A1 | 2/2018 | Heinle et al. | |
| 2019/0216289 A1 | 7/2019 | Vallejo et al. | |

FOREIGN PATENT DOCUMENTS

| | | |
|---|---|---|
| KR | 100477007 B1 | 3/2005 |
| KR | 20100113730 A | 10/2010 |

* cited by examiner

DISHWASHING APPLIANCE HAVING AN AIR-DRYING DEHUMIDIFICATION ASSEMBLY

FIELD OF THE INVENTION

The present subject matter relates generally to washer appliances, and more particularly to dishwashing appliances having an assembly for circulating drying air therein.

BACKGROUND OF THE INVENTION

Dishwashing appliances generally include a tub that defines a wash chamber for receipt of articles for washing. Certain dishwashing appliances also include a rack assembly slidably mounted within the wash chamber. A user can load articles, such as plates, bowls, glasses, or cups, into the rack assembly, and the rack assembly can support such articles within the wash chamber during operation of the dishwashing appliance. Spray assemblies within the wash chamber can apply or direct wash fluid towards articles disposed within the rack assemblies in order to clean such articles. Multiple spray assemblies can be provided, including, for example, a lower spray arm assembly mounted to the tub at a bottom of the wash chamber; a mid-level spray arm assembly mounted to one of the rack assemblies; or an upper spray assembly mounted to the tub at a top of the wash chamber. Other configurations may be used as well.

After the spray assemblies have washed or sprayed articles on the rack assemblies, typical dishwashing appliances provide one or more features to circulate air and remove moisture from (i.e., dry) the articles as part of a dry cycle. Commonly, such features are provided as part of a closed loop or an open loop system. Closed loop systems often draw air from the wash chamber through an inlet before returning that same air to the wash chamber (e.g., after being heated or dried). Open loop systems generally motivate air from the ambient environment to the wash chamber, such as through a small vent within the door or between the door and the cabinet.

These existing systems present a number of drawbacks. For instance, existing appliances often have difficulty managing the moisture or humidity within the air being circulated. In existing appliances with a closed loop system, an appliance may have difficulty removing moisture from air or may have a limited absorption capacity. Moreover, materials to absorb moisture, such as zeolite, can be expensive or difficult to incorporate. In existing appliances with an open loop system, performance may be uneven or undesirably influenced by humidity in the ambient air. Furthermore, energy is generally wasted to the ambient environment. Water or moisture may also accumulate or cause damage to the appliance or surrounding furniture (e.g., over time).

There is, thus, a need for an improved dishwashing appliance. In particular, it would be advantageous to provide a dishwashing appliance with one or more features to efficiently dry air within the wash chamber.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a tub, a water tank, a wet air duct, a dry air duct, a water supply conduit, a diverter valve, and a diverted branch. The tub may be housed within the cabinet and may define a wash chamber. The water tank may be mounted within the cabinet outside of the wash chamber. The wet air duct may extend from the wash chamber to the water tank. The dry air duct may extend from the water tank to the wash chamber. The water supply conduit may extend to the wash chamber. The diverter valve may be disposed along the water supply conduit upstream from the wash chamber. The diverted branch may extend from the diverter valve to the water tank to selectively guide water from the water supply conduit to the water tank.

In another exemplary aspect of the present disclosure, a dishwashing appliance is provided. The dishwashing appliance may include a cabinet, a tub, a water tank, a wet air duct, a dry air duct, a water supply conduit, a diverter valve, a diverted branch, and a controller. The tub may be housed within the cabinet and may define a wash chamber. The water tank may be mounted within the cabinet outside of the wash chamber. The wet air duct may extend from the wash chamber to the water tank. The dry air duct may extend from the water tank to the wash chamber. The water supply conduit may extend to the wash chamber. The diverter valve may be disposed along the water supply conduit upstream from the wash chamber. The diverted branch may extend from the diverter valve to the water tank to selectively guide water from the water supply conduit to the water tank. The controller may be operably coupled to the diverter valve. The controller may be configured to initiate a washing operation that may include initiating a tank fill directing water through the diverter valve to the water tank while restricting water flow to the wash chamber, and adjusting the diverter valve to direct water through the diverter valve to the wash chamber subsequent to the tank fill.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
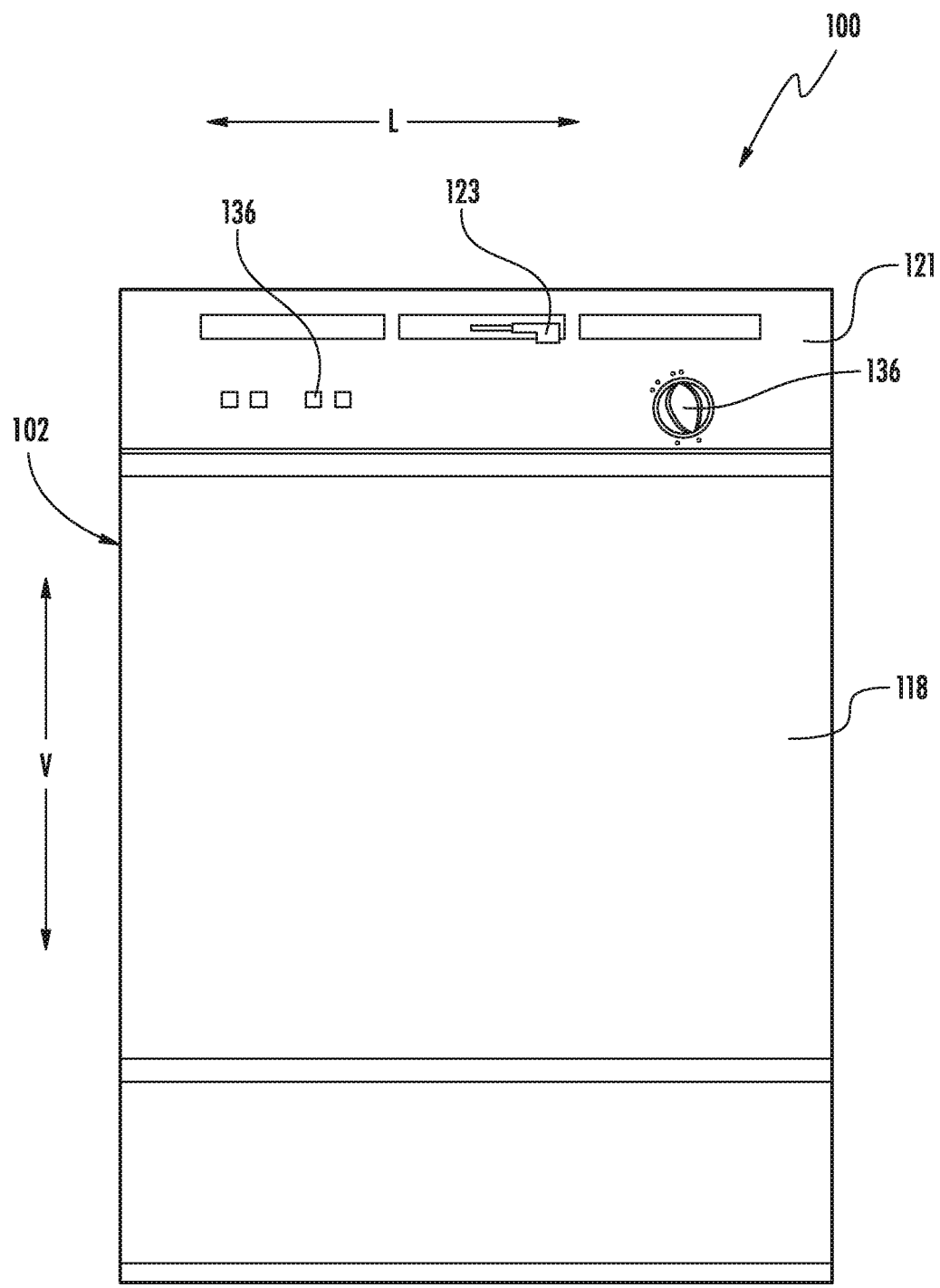
FIG. 1 provides a front elevation view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one element from another and are not intended to signify location or importance of the individual elements. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
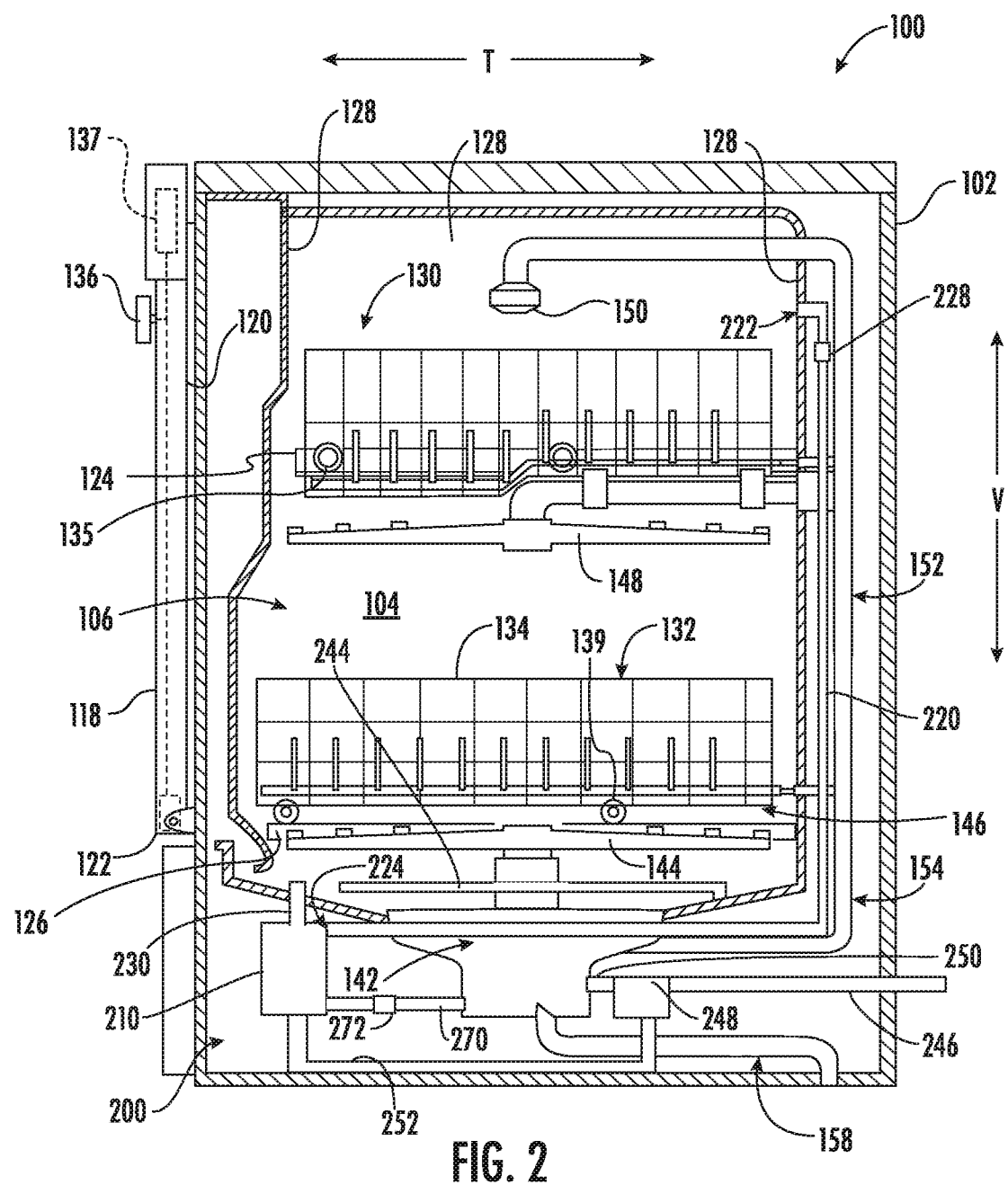
FIG. 2 provides a side, sectional view of the exemplary dishwashing appliance of FIG. 1.

FIGS. 1 and 2 depict an exemplary domestic dishwasher 100 that may be configured in accordance with aspects of the present disclosure. As shown, the dishwasher 100 includes a cabinet 102 having a tub 104 mounted therein that defines a wash chamber 106. Tub 104 includes a plurality of sidewalls 128 that define wash chamber 106. Tub 104 further includes a front opening and a door 118 hinged at its bottom 122 for movement between a closed (e.g., vertical) position (shown in FIGS. 1 and 2), wherein wash chamber 106 is sealed shut for a washing operation or wash cycle, and an opened (e.g., fully or partially open) position (not pictured) for loading and unloading of articles from the dishwasher 100. Thus, access to wash chamber 106 is generally restricted in the closed position, while access to wash chamber 106 is permitted in the opened position. In some embodiments, a latch 123 is used to lock and unlock door 118 for access to chamber 106. Door 118 includes an inner wall 120. The inner wall 120 further defines wash chamber 106 when the door 118 is in the closed position.

Upper and lower guide rails 124, 126 are mounted on tub side walls 128 and may accommodate roller-equipped rack assemblies 130 and 132. Each of the rack assemblies 130, 132 is fabricated into lattice structures including a plurality of elongated members 134 (for clarity of illustration, not all elongated members making up assemblies 130 and 132 are shown in FIG. 2). Each rack assembly 130, 132 is arranged in wash chamber 106, such that the rack assembly 130, 132 is capable of movement between an extended loading position (not shown) in which the rack is substantially positioned outside wash chamber 106, and a retracted position (shown in FIGS. 1 and 2) in which the rack is located inside wash chamber 106. This is, for example, facilitated by rollers 135 and 139, for example, mounted onto rack assemblies 130 and 132, respectively. A silverware basket (not shown) may be removably attached to rack assembly 132 for placement of silverware, utensils, and the like, that are otherwise too small to be accommodated by the rack assemblies 130, 132.

In some embodiments, the dishwasher 100 further includes a lower spray-arm assembly 144 that is rotatably mounted within a lower region 146 of wash chamber 106 and above a sump 142 so as to rotate in relatively close proximity to rack assembly 132. In some embodiments, a mid-level spray-arm assembly 148 is located in an upper region of wash chamber 106 and may be located in close proximity to upper rack 130. Additionally or alternatively, an upper spray assembly 150 may be located above the upper rack 130.

Each spray-arm assembly 144, 148 includes an arrangement of discharge ports or orifices for directing fluid onto dishes or other articles located in rack assemblies 130 and 132. The arrangement of the discharge ports in spray-arm assemblies 144, 148 may provide a rotational force by virtue of washing fluid flowing through the discharge ports. The resultant rotation of the spray-arm assemblies 144, 148 and the operation of spray assembly 150 may provide coverage of dishes and other dishwasher contents with a washing spray. Other configurations of spray assemblies may be used as well.

The lower and mid-level spray-arm assemblies 144, 148 and the upper spray assembly 150 may be provided as part of a fluid circulation assembly 152 for circulating water and dishwasher fluid in tub 104. In some embodiments, fluid circulation assembly 152 includes a circulation conduit 154 that supplies the fluid to the lower and mid-level spray-arm assemblies 144, 148 or the upper spray assembly 150. The conduit 154 may, for example, be in fluid communication with the sump 142 such that fluid can flow from the sump 142 into the conduit 154 as required.

As noted above, dishwasher assembly 100 further includes a sump 142, which may be provided in lower region 146 below, for example, lower spray-arm assembly 144. For instance, a portion of the bottom wall of tub 104 may be configured as a tub sump 142 to accommodate one or more components of the fluid recirculation assembly 152 (e.g., a filter assembly or other components). It should be appreciated that, in some embodiments, the bottom wall of tub 104 is formed as a single, unitary component such that the tub sump 142, as well as the surrounding portions of the bottom wall, are formed integrally with one another. Alternatively, the tub sump 142 may be configured as a separate component configured to be attached to the remaining portion(s) of the bottom wall.

During use, sump 142 generally collects fluid from wash chamber 106 for circulation within tub 104, such as back into wash chamber 106 through fluid circulation assembly 152, as well as drainage from tub 104 and dishwasher appliance 100 in general. Drainage may occur, for example, through a drain conduit 158 that is provided for draining fluid from the sump 142. The conduit 158 may, for example, be in fluid communication with the sump 142 such that fluid can flow from the sump 142 into the conduit 158 as required. Drain conduit 158 may flow the fluid from the sump 142 to, for example, external plumbing or another suitable drainage location.

As shown, dishwasher 100 is further equipped with a controller 137 to regulate operation of the dishwasher 100. The controller may include one or more memory devices and one or more microprocessors, such as general or special purpose microprocessors operable to execute programming instructions or micro-control code associated with a wash cycle. The memory may represent random access memory such as DRAM, or read only memory such as ROM or FLASH. In some embodiments, the processor executes programming instructions stored in memory. For certain embodiments, the instructions include a software package configured to operate appliance 100. The memory may be a separate component from the processor or may be included onboard within the processor.

The controller 137 may be positioned in a variety of locations throughout dishwasher 100. For instance, the controller 137 may be located within a control panel area 121 of door 118 as shown in FIGS. 1 and 2. In such an embodiment, input/output ("I/O") signals may be routed between the control system and various operational components of dishwasher 100 along wiring harnesses that may be routed through the bottom 122 of door 118. Typically, the controller 137 includes a user interface panel or controls 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or configuration of dishwasher. The exemplary embodiments depicted in FIGS. 1 and 2 are for illustrative purposes only. For example, different locations may be provided for user interface 136, different configurations may be provided for racks 130, 132, and other differences may be applied as well.

Figure 3:
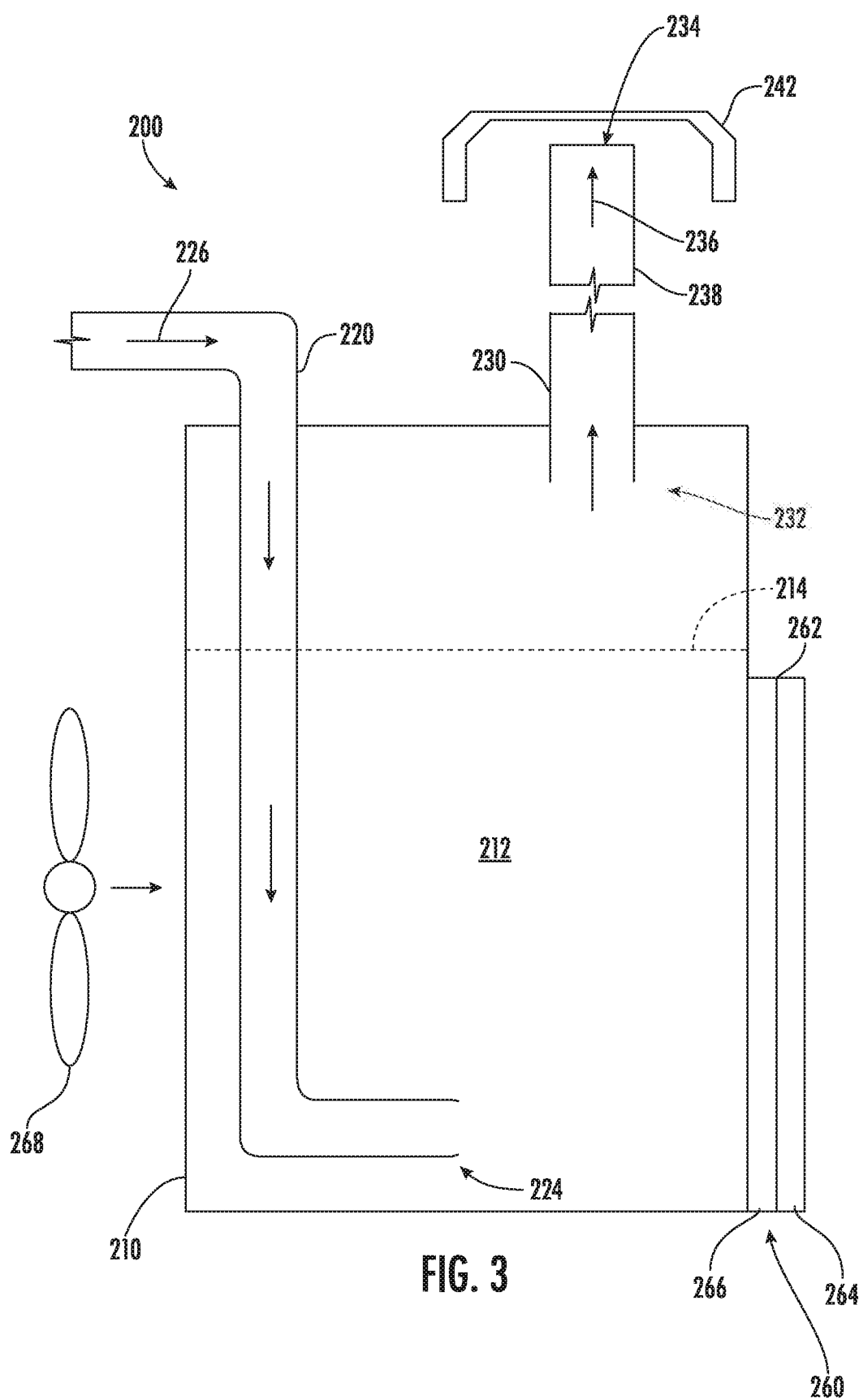
FIG. 3 provides a schematic view of the water tank of a dehumidification assembly of a dishwashing appliance according to exemplary embodiments of the present disclosure.
Figure 4:
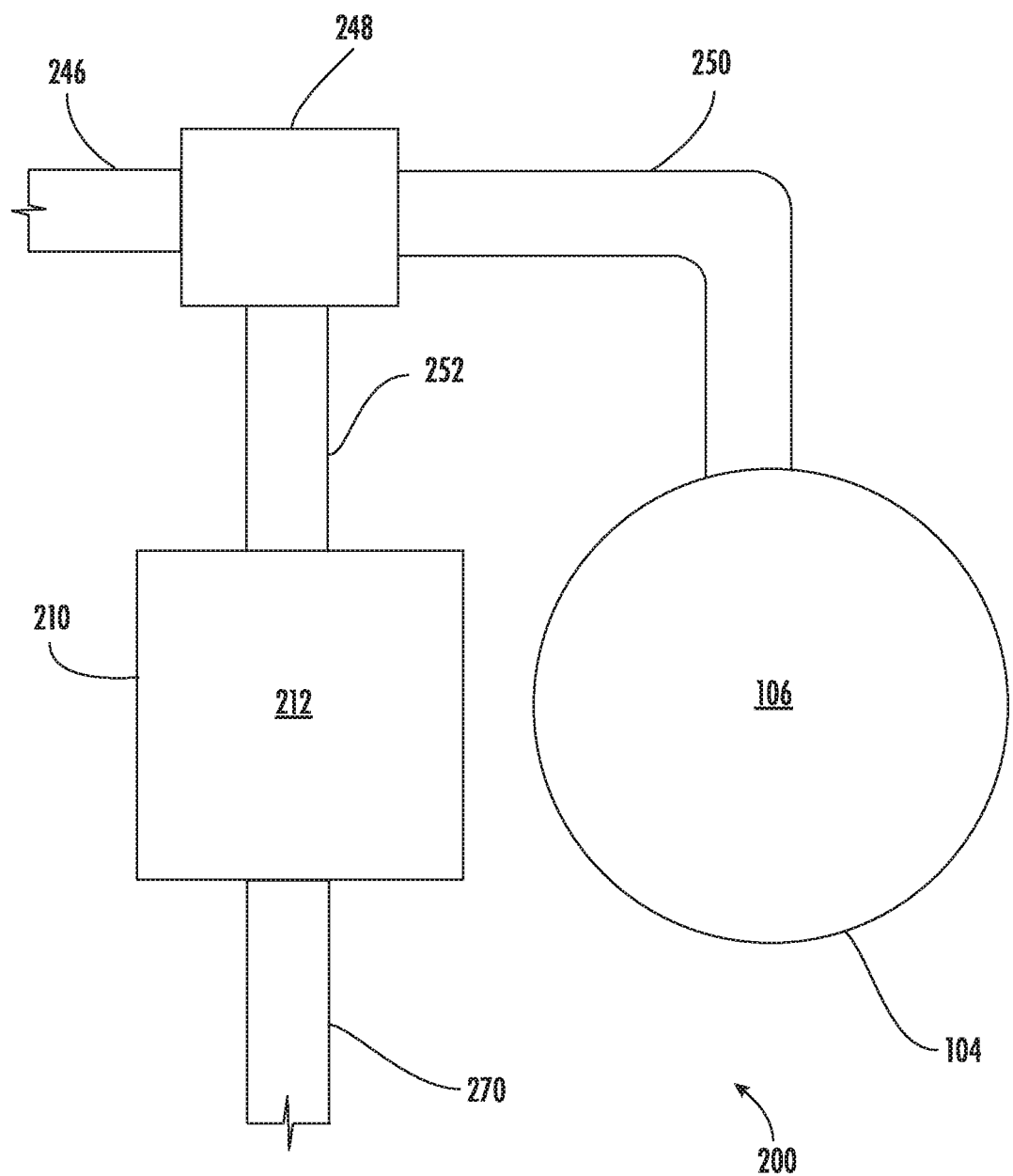
FIG. 4 provides a schematic view of a portion of a dehumidification assembly of a dishwashing appliance according to exemplary embodiments of the present disclosure.

Turning now to FIGS. 2 through 4, various views are provided that illustrate a dehumidification assembly 200 included with dishwashing appliance 100 according to exemplary embodiments of the present disclosure. Specifically, FIGS. 3 and 4 provide different schematic views of dehumidification assembly 200.

As shown, dehumidification assembly 200 includes a water tank 210 that is in fluid communication with wash chamber 106. In some embodiments, water tank 210 is mounted within the cabinet 102 and outside of wash chamber 106. Thus, water tank 210 generally defines a tank chamber 212 that is separate and discrete from wash chamber 106 within which a volume water (e.g., 0.4 to 1.8 liters) may be stored (e.g., temporarily). For instance, the volume of water may be stored within tank chamber 212 of water tank 210 up to a predefined fill line 214. The remaining volume of water tank 210 may be generally filled with air. Although shown as being mounted below wash chamber 106, it is understood that water tank 210 may be fixed at any suitable location to receive air from and transmit air to wash chamber 106, as will be described in detail below.

A wet air duct 220 may connect to or permit fluid communication between wash chamber 106 and water tank 210. In particular, wet air duct 220 extends from wash chamber 106 to water tank 210. For instance, wet air duct 220 may extend from an intake end 222 (e.g., defining a wet air inlet) disposed on or within tub 104 (e.g., proximal to wash chamber 106) to an output end 224 (e.g., defining a wet air outlet) disposed on or within water tank 210 (e.g., proximal to tank chamber 212). In certain embodiments, intake end 222 is mounted proximal to a top portion of tub 104 (e.g., closer along the vertical direction V to a top wall of tub 104 than the bottom wall of tub 104). As an example, the intake end 222 may be mounted above upper rack assembly 130 (e.g., through a sidewall 128). Generally, relatively hot or humid air will accumulate at the top portion of wash chamber 106. During use, such as during a washing operation or dry cycle, relatively hot or humid air (e.g., air or vapor) within wash chamber 106 may thus be drawn into wet air duct 220 (e.g., as a wet airflow 226) through the wet air inlet defined at intake end 222.

Opposite from intake end 222, output end 224 may extend through or within at least a portion of tank chamber 212. In some embodiments, output end 224 (and thus the wet air outlet) is disposed below the defined fill line 214. For instance, wet air duct 220 may terminate within tank chamber 212 and below the fill line 214. Additionally or alternatively, output end 224 may be disposed below the intake end 222. During use, the relatively humid air (e.g., wet airflow 226) received at intake end 222 may be directed through wet air duct 220 to the output end 224. From the output end 224, air may be forced through the volume of water within water tank 210 before rising above the fill line 214 and emerging as a relatively dry portion of air (e.g., dry airflow 236).

In optional embodiments, an internal air handler 228 (e.g., fan or blower) is disposed along wet air duct 220 to motivate air or vapor (e.g., as the wet airflow 226) from intake end 222 to output end 224 (i.e., to water tank 210). Generally, internal air handler 228 may include or be provided as any suitable air handler, such as an axial fan, tangential fan, etc. When assembled, internal air handler 228 may be positioned between the intake end 222 and output end 224 (i.e., downstream from the wet air inlet and upstream from the wet air outlet). Moreover, internal air handler 228 may be in operative (e.g., electrical or wireless) communication with controller 137. Controller 137 may thus selectively direct internal air handler 228 to rotate or otherwise motivate air (e.g., the wet airflow 226) through wet air duct 220 to water tank 210.

Separately from or together with wet air duct 220, a dry air duct 230 connects to or prevents fluid communication between water tank 210 and wash chamber 106. In particular, dry air duct 230 extends from water tank 210 to wash chamber 106.

For instance, dry air duct 230 may extend from an intake end 232 (e.g., defining a dry air inlet) disposed on or within water tank 210 (e.g., proximal to tank chamber 212) to an output end 234 (e.g., defining a dry air outlet) disposed on or within tub 104 (e.g., proximal to wash chamber 106). In certain embodiments, intake end 232 is mounted proximal to a top portion of water tank 210 (e.g., closer along the vertical direction V to a top wall of water tank 210 than a bottom wall of water tank 210 or tub 104). As an example, the intake end 232 may be mounted above the fill line 214 (e.g., extending from or through an upper wall of water tank 210). During use, such as during a washing operation or dry cycle, air (e.g., the dry airflow 236) within tank chamber 212 may thus be drawn into dry air duct 230 through the dry air inlet defined at intake end 232.

Opposite from intake end 232, output end 234 may extend through or within at least a portion of tub 104. In some embodiments, output end 234 (and thus the wet air outlet) is disposed above sump 142 or the bottom wall of tub 104. For instance, dry air duct 230 may include a standpipe 238 that extends vertically through the bottom wall of tub 104 within wash chamber 106. Additionally or alternatively, the standpipe 238 may be disposed below the lower rack assembly 132 (e.g., to direct the dry airflow 236 thereto). Advantageously, water vapor may be effectively and efficiently scrubbed from air within wash chamber 106 (e.g., the wet airflow 226) before such air is returned to wash chamber 106 (e.g., with the dry airflow 236).

In some embodiments, intake end 232 of dry air duct 230 is disposed below the output end 234. During use, the relatively dry air (e.g., dry airflow 236) received at intake end 232 may be directed through dry air duct 230 to the output end 234. From the output end 234, air may be returned to tub 104 within wash chamber 106 (e.g., via forced or natural convection of the dry airflow 236). In optional embodiments, a pipe cap 242 is mounted on the standpipe 238. For instance, pipe cap 242 may be spaced apart (e.g., vertically) from the dry air outlet at output end 234. The dry airflow 236 may thus be permitted exit dry air duct 230 and flow along the bottom surface of pipe cap 242 as the dry airflow 236 is released to wash chamber 106. Additionally or alternatively pipe cap 242 may cover at least a portion of the dry air outlet at output end 234 (e.g., extend over and about standpipe 238). Water flowing or falling within wash chamber 106 may thus be prevented from entering dry air duct 230 through the output end 234.

In additional or alternative embodiments, a heater 244 (e.g., electric heating element) is mounted within wash chamber 106. Generally, heater 244 may include or be provided as any suitable air heating element, such as a resistive heat element, radiant heat element, etc. When assembled, heater 244 may be positioned on or above a bottom wall of tub 104. Moreover, heater 244 may be in operative (e.g., electrical or wireless) communication with controller 137. Controller 137 may thus selectively activate heater 244 to operate or otherwise generate heat within wash chamber 106 (e.g., from dry air duct 230).

As shown, a water supply conduit 246 extends to wash chamber 106 to supply an initial volume of water from a hot water source (e.g., a residential or commercial hot water heater appliance). Optionally, the water supply conduit 246 may connect solely to the hot water source as the only water input of dishwashing appliance, as is common for dishwashers in North America.

Along the water supply conduit 246, a diverter valve 248 is disposed. In particular, diverter valve 248 may be mounted within the cabinet 102 or upstream from wash chamber 106. Multiple different branches 250, 252 may extend from diverter valve 248. For instance, a primary branch 250 may extend to tub 104 (e.g., at sump 142) to selectively supply or direct water to wash chamber 106. Separately, a diverted branch 252 may extend to water tank 210 to selectively supply or direct water to tank chamber 212.

Generally, diverter valve 248 may be any suitable multipath valve for selectively directing water to the different branches 250, 252. Thus, diverter valve 248 may include multiple operating positions, such as a primary position permitting water to the primary branch 250 while restricting water to the diverted branch 252, a diverted position permitting water to the diverted branch 252 while restricting water to the primary branch 250, or a closed position restricting water to both the primary branch 250 and the diverted branch 252.

When assembled, diverter valve 248 and diverted branch 252 may be disposed upstream from water tank 210 to selectively guide water from the water supply conduit 246 to water tank 210. Moreover, diverter valve 248 may be in operative (e.g., electrical or wireless) communication with controller 137. Controller 137 may thus selectively direct diverter valve 248 between the operating positions to selectively control the flow of water to wash chamber 106 or water tank 210.

In some such embodiments, controller 137 is configured to direct diverter valve 248 as part of a washing operation. For instance, the controller 137 may initiate a tank fill directing water through diverter valve 248 (e.g., in the diverted position) while restricting water flow to the wash operation. The tank fill may, for example, provide the volume of water to reach the level of the fill line 214. Optionally, the tank fill may occur prior to any other water being directed to wash chamber 106. Thus, wash chamber 106 may be empty of water during the tank fill. The tank fill may thus halt or end once a predetermined volume of water has been provided or a predetermined amount of time has expired.

Subsequent to the tank fill (e.g., after water tank 210 has been filled to the fill line 214), the washing operation may include adjusting diverter valve 248 (e.g., moving diverter valve 248 to the primary position) to direct water through diverter valve 248 to wash chamber 106. Thus, the water directed to water tank 210 during the tank fill may be a relatively cold water plug previously held in the lines or conduits between water supply conduit 246 and the hot water source. Advantageously, the water directed to wash chamber 106 subsequent to the tank fill may be heated to a relatively high temperature selected for a washing operation.

Although the water within water tank 210 may be provided at a relatively cold temperature, advantageously increasing the ability of such water to absorb vapor from the wet airflow 226 via direct contact, optional embodiments may include an additional tank chiller 260 in thermal communication with water tank 210. During use, such as during a washing operation or dry cycle, the tank chiller 260 may facilitate heat transfer from water tank 210, and specifically from water within tank chamber 212.

In some embodiments, tank chiller 260 includes a thermoelectric heat exchanger (TEHE) in conductive thermal communication (e.g., direct contact) with water tank 210. Generally, TEHE 262 may be any suitable solid state, electrically-driven heat pump, such as a Peltier device. TEHE 262 may include a distinct hot side 264 (e.g., mounted distal to water tank 210) and cold side 266 (e.g., mounted proximal to or on water tank 210). A heat flux created between the junction of hot side 264 and cold side 266 may draw heat from the cold side 266 to the hot side 264 (e.g., as driven by an electrical current). Thus, when active, the cold side 266 of TEHE 262 may be maintained at a lower temperature than the hot side 264 of TEHE 262. In some embodiments, TEHE 262 is in operative communication with (e.g., electrically coupled to) controller 137, which may thus control the activation of or current to TEHE 262.

In additional or alternative embodiments, tank chiller 260 includes an ambient air handler 268 (e.g., fan or blower) configured to selectively motivate an ambient airflow across an outer surface of water tank 210. Thus, the airflow motivated by ambient air handler 268 may be separate and fluidly isolated from wet and dry airflows 226, 236. Generally, ambient air handler 268 may include or be provided as any suitable air handler, such as an axial fan, tangential fan, etc. When assembled, ambient air handler 268 may be mounted within cabinet 102 and directed at water tank 210. Moreover, ambient air handler 268 may be in operative (e.g., electrical or wireless) communication with controller 137. Controller 137 may thus selectively direct ambient air handler 268 to rotate or otherwise motivate air across the outside of water tank 210.

In some embodiments, a drain conduit 270 extends from water tank 210 to selectively drain water therefrom. For instance, drain conduit 270 may extend from water tank 210 at a location below the fill line 214 such that gravity or a separate pump (not pictured) can draw the volume of water from water tank 210 (e.g., following a drying cycle). In certain embodiments, drain conduit 270 extends to the sump 142. For instance, drain conduit 270 may be in fluid communication between water tank 210 and the sump 142. Optionally, the output or connection of drain conduit 270 to the sump 142 may be below the output or connection of the primary branch 250. When water is no longer needed or desired within water tank 210 a drain valve 272 (e.g., mounted along drain line) may be opened to permit water to flow to wash chamber 106 or sump 142, where such water may be further drained from drain conduit 158, as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance comprising:
    a cabinet;
    a tub housed within the cabinet and defining a wash chamber;
    a water tank mounted within the cabinet outside of the wash chamber;
    a wet air duct extending from the wash chamber to the water tank;
    a dry air duct extending from the water tank to the wash chamber;
    a water supply conduit extending to the wash chamber;
    a diverter valve disposed along the water supply conduit upstream from the wash chamber; and
    a diverted branch extending from the diverter valve to the water tank to selectively guide water from the water supply conduit to the water tank.

2. The dishwashing appliance of claim 1, wherein the tub defines a sump below the wash chamber to receive water therefrom, and wherein the dishwashing appliance further comprises a drain conduit extending from the water tank to the sump.

3. The dishwashing appliance of claim 1, further comprising an internal air handler disposed along the wet air duct upstream from the water tank to selectively motivate a wet airflow to the water tank.

4. The dishwashing appliance of claim 1, wherein the dry air duct comprises a standpipe extending vertically through a bottom wall of the tub, the standpipe defining a dry air outlet within the wash chamber.

5. The dishwashing appliance of claim 4, further comprising a pipe cap mounted on the standpipe, the pipe cap being spaced apart from the dry air outlet to permit a dry airflow from the dry air duct to the wash chamber.

6. The dishwashing appliance of claim 1, wherein the water tank defines a fill line for a volume of water therein, and wherein the wet air duct defines a wet air outlet disposed within the water tank below the fill line.

7. The dishwashing appliance of claim 1, further comprising a tank chiller in thermal communication with the water tank to transfer heat from water therein.

8. The dishwashing appliance of claim 7, wherein the tank chiller comprises a thermoelectric heat exchanger mounted on the water tank.

9. The dishwashing appliance of claim 7, wherein the tank chiller comprises an ambient air handler configured to selectively motivate an ambient airflow across an outer surface of the water tank.

10. A dishwashing appliance comprising:
    a cabinet;
    a tub housed within the cabinet and defining a wash chamber;
    a water tank mounted within the cabinet outside of the wash chamber;
    a wet air duct extending from the wash chamber to the water tank;
    a dry air duct extending from the water tank to the wash chamber;
    a water supply conduit extending to the wash chamber;
    a diverter valve disposed along the water supply conduit upstream from the wash chamber;
    a diverted branch extending from the diverter valve to the water tank to selectively guide water from the water supply conduit to the water tank; and
    a controller operably coupled to the diverter valve, the controller being configured to initiate a washing operation, the washing operation comprising
        initiating a tank fill directing water through the diverter valve to the water tank while restricting water flow to the wash chamber, and
        adjusting the diverter valve to direct water through the diverter valve to the wash chamber subsequent to the tank fill.

11. The dishwashing appliance of claim 10, wherein the tub defines a sump below the wash chamber to receive water therefrom, and wherein the dishwashing appliance further comprises a drain conduit extending from the water tank to the sump.

12. The dishwashing appliance of claim 10, further comprising an internal air handler disposed along the wet air duct upstream from the water tank to selectively motivate a wet airflow to the water tank.

13. The dishwashing appliance of claim 10, wherein the dry air duct comprises a standpipe extending vertically through a bottom wall of the tub, the standpipe defining a dry air outlet within the wash chamber.

14. The dishwashing appliance of claim 13, further comprising a pipe cap mounted on the standpipe, the pipe cap being spaced apart from the dry air outlet to permit a dry airflow from the dry air duct to the wash chamber.

15. The dishwashing appliance of claim 10, wherein the water tank defines a fill line for a volume of water therein, and wherein the wet air duct defines a wet air outlet disposed within the water tank below the fill line.

16. The dishwashing appliance of claim 10, further comprising a tank chiller in thermal communication with the water tank to transfer heat from water therein.

17. The dishwashing appliance of claim 16, wherein the tank chiller comprises a thermoelectric heat exchanger mounted on the water tank.

18. The dishwashing appliance of claim 16, wherein the tank chiller comprises an ambient air handler configured to selectively motivate an ambient airflow across an outer surface of the water tank.

* * * * *